(12) United States Patent
Debski et al.

(10) Patent No.: US 10,173,189 B2
(45) Date of Patent: Jan. 8, 2019

(54) METHOD FOR PREPARING A SUSPENSION CONTAINING CARBON NANOTUBES AND STABLE SUSPENSION OBTAINED IN THIS WAY

(71) Applicant: COMMISSARIAT À L'ÉNERGIE ATOMIQUE ET AUX ÉNERGIES ALTERNATIVES, Paris (FR)

(72) Inventors: Nicolas Debski, Palaiseau (FR); Martine Mayne-L'Hermite, Les Molieres (FR); Mathieu Pinault, Antony (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 163 days.

(21) Appl. No.: 15/121,434

(22) PCT Filed: Feb. 27, 2015

(86) PCT No.: PCT/EP2015/054123
§ 371 (c)(1),
(2) Date: Aug. 25, 2016

(87) PCT Pub. No.: WO2015/128457
PCT Pub. Date: Sep. 3, 2015

(65) Prior Publication Data
US 2016/0362300 A1    Dec. 15, 2016

(30) Foreign Application Priority Data

Feb. 28, 2014    (FR) ..................................... 14 51656

(51) Int. Cl.
*B01F 17/00*        (2006.01)
*C01B 32/174*      (2017.01)
(Continued)

(52) U.S. Cl.
CPC ...... *B01F 17/0057* (2013.01); *B01F 17/0021* (2013.01); *C01B 32/174* (2017.08);
(Continued)

(58) Field of Classification Search
CPC . C01B 31/0273; C01B 32/194; C01B 32/174; C01B 2202/34; C01B 2202/06;
(Continued)

(56) References Cited

U.S. PATENT DOCUMENTS

2010/0330358 A1    12/2010  Hashimoto
2011/0244585 A1    10/2011  Mayne-L'Hermite et al.
(Continued)

FOREIGN PATENT DOCUMENTS

WO    2006062785 A1    6/2006
WO    2007080323 A2    7/2007
(Continued)

OTHER PUBLICATIONS

Machine Translation of Publ. No. WO-2007/080323 (A2), published Jul. 2007, European patent Office, obtained online @ http://ep.espacenet.com/ (Downloaded Mar. 19, 2018).*
(Continued)

*Primary Examiner* — Daniel S Metzmaier
(74) *Attorney, Agent, or Firm* — Pearne & Gordon LLP

(57) ABSTRACT

The present invention concerns a method for preparing a suspension of carbon nanotubes in an aqueous solution comprising the following successive steps consisting of subjecting an aqueous solution containing carbon nanotubes and a surfactant to at least one cycle of freezing in liquid nitrogen and thawing; and subjecting said thawed solution to an ultrasound treatment. The present invention also concerns a suspension of carbon nanotubes, and in particular a suspension of long carbon nanotubes, that can be prepared by such a method.

20 Claims, 4 Drawing Sheets

(52) U.S. Cl.
CPC ...... *C01B 2202/02* (2013.01); *C01B 2202/06* (2013.01); *C01B 2202/34* (2013.01)

(58) Field of Classification Search
CPC .............. C01B 2202/02; B01F 17/0057; B01F 17/0021
USPC ........... 516/41, 929, 930; 977/742, 750, 752
See application file for complete search history.

(56) References Cited

U.S. PATENT DOCUMENTS

| | | | |
|---|---|---|---|
| 2011/0301251 A1* | 12/2011 | Shen ..................... | B82Y 30/00 516/43 |
| 2013/0108865 A1 | 5/2013 | Boulanger et al. | |
| 2013/0189586 A1 | 7/2013 | Sarrazin et al. | |
| 2016/0289826 A1* | 10/2016 | Boulanger ........... | B01J 19/1862 |

FOREIGN PATENT DOCUMENTS

| | | |
|---|---|---|
| WO | 2009063008 A1 | 5/2009 |
| WO | 2010106287 A2 | 9/2010 |

OTHER PUBLICATIONS

Gastro, C., et al., "The Role of Hydrogen in the Aerosol-Assisted Chemical Vapor Deposition Process in Producing Thin and Densely Packed Vertically Aligned Carbon Nanotubes", "Carbon", May 31, 2013, pp. 585-594 vol. 61.

Garg, P., et al., "An Experimental Study on the Effect of Ultrasonication on Viscosity and Heat Transfer Performance of Multi-Wall Carbon Nanotube-Based Aqueous Nanofluids", "International Journal of Heat and Mass Transfer", Jun. 17, 2009, pp. 5090-5101, vol. 52.

Hilding, J., et al, "Dispersion of Carbon Nanotubes in Liquids", 2003, pp. 141, vol. 24, No. 1.

Krause, B., et al, "Influence of Dry Grinding in a Ball Mill on the Length of Multiwalled Carbon Nanotubes and Their Dispersion and Percolation Behaviour in Melt Mixed Polycarbonate Composites", "Composites Science and Technology", Apr. 13, 2011, pp. 1145-1153, vol. 71.

Tang, C., et al, "Wet-Grinding Assisted Ultrasonic Dispersion of Pristine Multi-Walled Carbon Nanotubes (MWCNTs) in Chitosan Solution", "Colloids and Surfaces B: Biointerfaces", pp. 189-197, vol. 86, (2010), available online Apr. 5, 2011.

Xu, G., et al., "A Two-Step Shearing Strategy to Disperse Long Carbon Nanotubes from Vertically Aligned Multiwalled Carbon Nanotube Arrays for Transparent Conductive Films", "Langmuir", Oct. 9, 2009, pp. 2798-2804, vol. 26.

Yu, J., et al., "Controlling the Dispersion of Multi-Walled Carbon Nanotubes in Aqueous Surfactant Solution", "Carbon", (2007), pp. 618-623, vol. 45, Available onlineNov. 28, 2006.

* cited by examiner

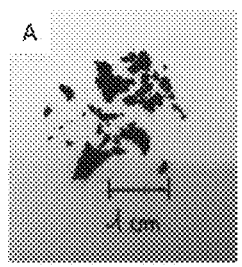 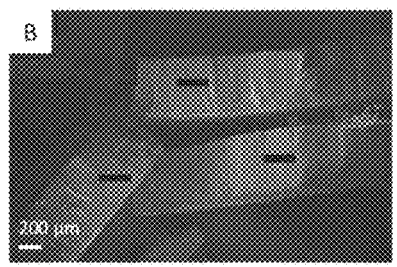 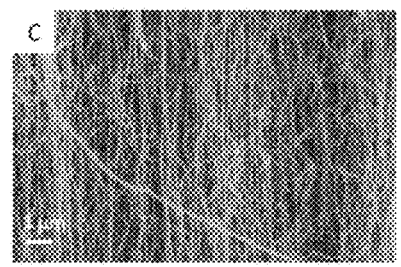
FIG.1A　　　FIG.1B　　　FIG.1C
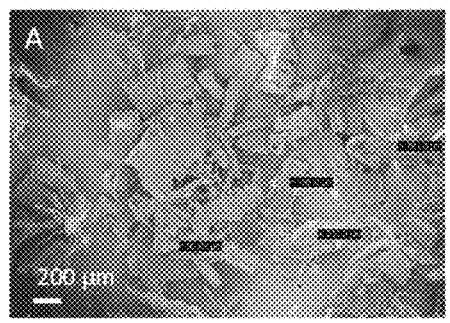 
FIG.2A　　　FIG.2B
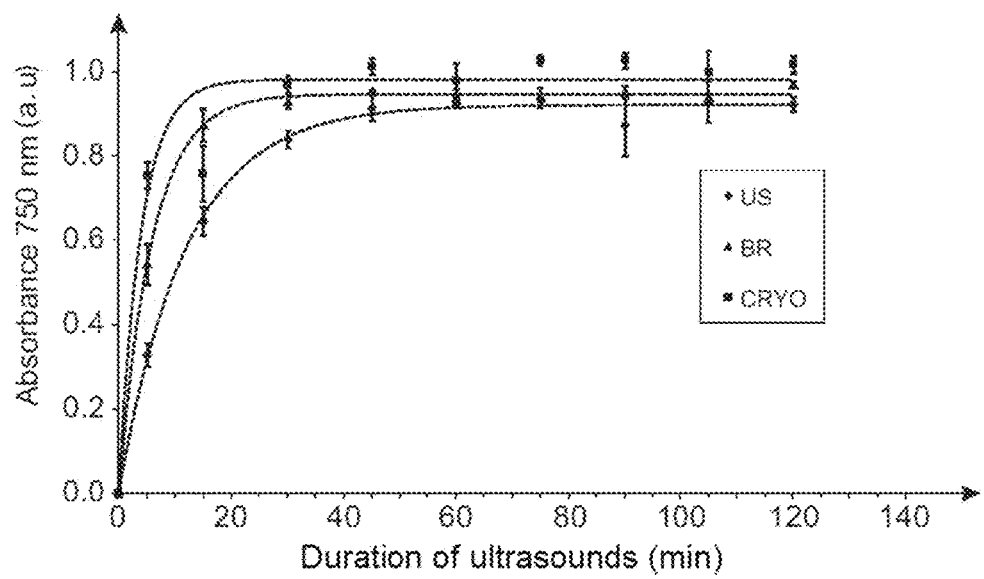
FIG.3

METHOD FOR PREPARING A SUSPENSION CONTAINING CARBON NANOTUBES AND STABLE SUSPENSION OBTAINED IN THIS WAY

CROSS-REFERENCE TO RELATED APPLICATIONS

This application is a U.S. national phase under the provisions of 35 U.S.C. § 371 of International Patent Application No. PCT/EP15/54123 filed Feb. 27, 2015, which in turn claims priority of French Patent Application No. 1451656 filed Feb. 28, 2014. The disclosures of such international patent application and French priority patent application are hereby incorporated herein by reference in their respective entireties, for all purposes.

TECHNICAL FIELD

The present invention belongs to the field of nanotechnologies and, more particularly, to the field of nano-objects such as carbon nanotubes.

The present invention provides a method for preparing a stable suspension of nano-objects such as a stable suspension of carbon nanotubes and, more particularly, a stable suspension of long carbon nanotubes that can reach up to several micrometers in aqueous liquid media.

The present invention also relates to the suspensions obtained by the implementation of the method according to the present invention.

STATE OF PRIOR ART

Carbon nanotubes (CNT) have exceptional electrical, mechanical and thermal properties. One of the favored avenues for using these nanomaterials is to make composites the manufacture of which involves making suspensions of carbon nanotubes. These composites can be in different forms (solid materials, fibers, . . . ) and are of great interest in industry because, for relatively low load rates (in the order of one mass percent), an improvement in the electrical and mechanical properties is observed with respect to the polymeric matrix alone. On the other hand, the final properties of these composites are not only related to this load rate but also to the length of the CNT in the composite.

The manufacture of these composites involves the implementation of a stable homogeneous suspension of CNT. However, this implementation is quite delicate because the nanotubes are hydrophobic particles, bonded to each other by interactions mainly of the Van der Waals type, which limits their dispersion in most polar solvents.

To achieve a stable homogeneous suspension of CNT, it is possible to add a surfactant to the solvent to modify the surface energy of the CNT but also to use an external energy source to deagglomerate them. This energy supply is generally made by the use of ultrasounds using a bath or a probe. The advantage of ultrasounds is to very well disperse the CNT but also to generate a drastic decrease in their length as shown in Hilding et al [1]. At page 17, FIG. 14 showing the change in the length of the CNT as a function of the duration of application of ultrasounds in a toluene solution highlights that the initial length is divided by a factor 5 after 5 min of ultrasounds.

That is why, a number of groups have turned to the combination of several dispersion techniques in order to limit this drastic decrease in the length of the CNT. The main idea is to pre-disperse the CNT to reduce the agglomerate size and to complete the dispersion with ultrasounds or any other technique.

Changyu et al have made suspensions by pre-dispersing CNT by wet grinding in a water solution containing acetic acid and a polyoside, i.e. chitosan, and then the suspension is subjected to ultrasounds using a bath [2]. FIG. 2 of page 192 represents the absorbance of the suspension as a function of the wavelength and clearly shows an increase in this absorbance and therefore of the dispersion quality. Thereby, they highlight the use of a pre-dispersion for a CNT concentration of 0.4 mg/ml, but they do not provide accurate information about the length of the CNT in the dispersion, nor on the stability of the latter.

Krause et al have investigated the influence of a dry grinding using a planar grinder before the use of ultrasounds [3]. For this, they have used different types of CNT, ground for several durations that they have put, at a concentration of 0.07 mg/ml, in an aqueous solution containing sodium dodecylbenzenesulfonate (SDBS) as a surfactant. The ultrasound is applied using a probe. The suspension obtained with raw CNT requires shorter ultrasound treatment durations as compared with ground CNT to achieve a total dispersion state. It would seem that grinding creates a compacting effect which would be detrimental to a good dispersibility of the CNT. However, the authors only provide the length distribution of the CNT before and after grinding, where the 90 decile switches from 3.3 μm to 1 μm for a mean value lower than one μm. As regards stability overtime, no information is given in this paper.

International application WO 2010/106287 provides a method for dispersing CNT by using two physical stirrings with a first phase of wet ball grinding followed by a phase of ultrasound dispersion [4]. The liquid medium used in this document comprises a liquid matrix and a polymer type dispersing agent as sodium carboxy methyl cellulose. The pictures obtained by optical microscopy of the suspension shows an improvement in the dispersion state and a decrease in the agglomerate size. The same is true with UV-visible analyses which show a decrease in the intensity transmitted, therefore an increase in the absorbance of the solution which results in a better dispersion state. However, no information is given as regards the length of the suspended CNT and the stability. On the other hand, this document claims a load rate of CNT that can range from 0.1% to 3% by mass in the liquid medium.

Patent application US 2010/0330358 reports a method for dispersing CNT which firstly consists in stirring a CNT+alcoholic solvent+polyvinyl acetal resin mixture followed by a phase of ultrasound treatment [5]. The thus obtained suspension is fully dispersed, stable over a period of 2 weeks and contains CNT with a length higher than 1 μm. The patent claims a CNT concentration between 0.005 mg/ml and 10 mg/ml and in particular between 0.005 mg/ml and 2 mg/ml, as well as a length in solution higher than or equal to 1 μm.

International application WO 2009/063008 provides a method for preparing a polymeric film containing and reinforced by CNT [6]. The method described involves a dispersion phase which can be made by ultrasounds, high speed stirring or a combination of both. The medium consists of water and a water soluble polymer or water and a water soluble surfactant. The dispersion state is assessed by UV-visible analyses and corresponds to the time when the absorbance has reached a maximum. The lengths of the suspended CNT do not exceed 2 to 3 μm for an aspect ratio (CNT length/CNT external diameter) lower than 300. The particular example described in this document implements CNT at a concentration of 0.04 mg/ml in an aqueous solution containing sodium dodecylsulfate (SDS). On the other hand, no information is given about the stability overtime of these suspensions.

U.S. Pat. No. 8,324,487 provides a method for preparing CNT treated with a surfactant, i.e. coated with a surfactant and being dry, which can be redispersed in aqueous or organic solvents so as to extemporaneously produce stable dispersions [7]. This method comprises a $1^{st}$ dispersion step followed by a $2^{nd}$ drying step. The $1^{st}$ step consists in dispersing by ultrasounds CNT present in an aqueous solution containing a surfactant and then subjecting the solution to a magnetic stirring and finally to a centrifugation, in order to separate, by settling, the remaining agglomerates from the supernatant. This document reports an example of a suspension made with 1 mg/ml CNT. After centrifugation, the suspension (i.e. the supernatant) is homogeneous and stable over a period of 3 to 6 months (example 1). The drying step consists in lyophilizing the suspension by dipping into liquid nitrogen (which results in freezing the suspension) and then sublimating water in order to obtain a CNT powder covered with surfactant. The patent does not mention information about the length of the suspended CNTs.

Finally, Xu et al describe a dispersion method comprised of two high speed stirring phases to obtain suspended long CNT [8]. The tubes used are vertically aligned carpets synthetized by catalytic CVD from a ferrocene/cyclohexane solution and have a length of 5 mm and a diameter between 30 and 60 nm. These CNT are dry pre-dispersed using a high speed mixer (24 000 rpm) for 60 to 600 s. The thus obtained powder is suspended in benzenic alcohol at an amount of 0.004 mg/ml. The suspension is then stirred at a speed of 6 000 to 7 000 rpm. In order to compare this method to other more conventional dispersion ways, the second stirring phase is replaced either by ultrasounds, or a wet grinding using a mortar. The three manufacturing ways enable a dispersed suspension without agglomerates to be obtained. However, with high speed stirring, the mean length of the suspended CNT is 38.5±19.3 µm versus 31.4±20.1 µm for the way employing ultrasounds and 1.51±0.79 µm for the way employing grinding. These results show that grinding is a destructive technique for CNT, which is confirmed by Raman spectroscopy analyses showing that the intensity ratio of the peak D to the peak G ($I_D/I_G$ ratio) increases from 0.647 to 0.911 whereas it remains nearly the same for the other two techniques. The suspensions are stable for about 3 h30 before agglomerates occur.

In conclusion, the utilization of a pre-dispersion phase finally enables suspensions to be obtained, within which the nanotubes are better individualized leading to a better dispersion state of these objects in the liquid medium. In addition, mechanical grinding is often used during the pre-dispersion phase for reducing the agglomerate size, whereas this technique creates many defects on the CNT and seems to make the dispersion of CNT more difficult. Finally, a single team [8] has obtained tubes with a length higher than 5 µm in solution but with an extremely low concentration (0.004 mg/ml), which is rarely compatible with the manufacture of composite materials.

Thus, there is a real need for a method making it possible to individualize nanotubes without inducing their breakage or without altering their properties during the dispersion step. Indeed, having stable suspended long nanotubes containing high nanotubes concentrations paves the way for the manufacture of different types of composite nanomaterials in which the length of the nanotubes could be put to good use for all the mechanical, electrical and thermal properties of these materials.

DISCLOSURE OF THE INVENTION

The object of the present invention is to provide an operational method which meets, among other things, the needs indicated above, that is a method enabling long carbon nanotubes present in interesting amounts to be maintained in suspension in a liquid medium, in particular an aqueous medium, in view of the subsequent use of the suspension.

In addition, the method of the present invention is remarkable because it is not only applicable to long nanotubes and in particular to long nanotubes having the form of a carpet but also to any type of intermingled or aligned nanotubes regardless of their preparing method and their length.

The method of the present invention is in particular characterized by the implementation of a pre-dispersion phase by dissipation of a mechanical energy internal to the system itself, generated by freezing/thawing, i.e. by volume expansion and the local mechanical stresses which can result therefrom following a return to the liquid state, which makes it possible to limit the use of an external mechanical energy source, such as ultrasounds or grinding (to name only the most conventional dispersing means), required for dispersing hydrophobic nano-objects, such as carbon nanotubes, in a hydrophilic liquid in order to avoid breaking of nanotubes. Thus thanks to the pre-dispersion step, the invention allows the reduction of the duration of exposure to ultrasounds by taking advantage to their efficiency for homogenizing the medium while minimizing breaking of the tubes. The invention makes it possible to obtain a stable suspension by reducing the time of exposure to ultrasounds by 20 to 40% with respect to the conventional methods.

By "stable suspension" or "stable dispersion", it is meant within the scope of the present invention a suspension or dispersion in which the nanotubes do not or hardly settle to the naked eye and remain in suspension for at least 24 hours, for at least 7 days, for at least one month or even for at least six months.

Thus, the present invention relates to a method for preparing a suspension of carbon nanotubes in an aqueous solution comprising the following successive steps consisting in:
  subjecting an aqueous solution containing carbon nanotubes and a dispersing agent to at least one cycle of freezing in liquid nitrogen and thawing; and
  subjecting said thawed solution to an ultrasound treatment.

More particularly, the method for preparing a suspension of carbon nanotubes according to the present invention comprises the following steps consisting in:
  a) contacting, without mechanical stirring, carbon nanotubes with an aqueous solution containing at least one dispersing agent;
  b) subjecting the aqueous solution containing carbon nanotubes and a dispersing agent obtained following step (a) to at least one cycle of freezing in liquid nitrogen and thawing;
  c) subjecting the thawed solution obtained following step (b) to an ultrasound treatment.

Even more particularly, the method for preparing a suspension of carbon nanotubes according to the present invention comprises the following steps consisting in:

a) contacting, without mechanical stirring and without ultrasound treatment, carbon nanotubes with an aqueous solution containing at least one dispersing agent;

b) subjecting, without mechanical stirring and without ultrasound treatment, the aqueous solution containing carbon nanotubes and a dispersing agent obtained following step (a) to at least one cycle of freezing in liquid nitrogen and thawing;

c) subjecting the thawed solution obtained following step (b) to an ultrasound treatment.

Advantageously, the aqueous solution in which the carbon nanotubes are dispersed in accordance with the method of the present invention and thus the aqueous solution implemented during step (a) of the method according to the invention contains, as a solvent, water and possibly another protic solvent.

By "water", it is intended, within the scope of the present invention, both tap water, deionized water, distilled water such as ultra-pure water (18.2 MΩ), all these waters can possibly be acidified or basic.

By "protic solvent", it is intended, within the scope of the present invention, a solvent which includes at least one hydrogen atom likely to be released as a proton. The protic solvent possibly used within the scope of the present invention is different from water. Thus, the protic solvent is advantageously selected from the group consisting of acetic acid, hydroxylated solvents such as, for example, methanol and ethanol, low molecular weight liquid glycols such as ethyleneglycol, and mixtures thereof.

In a first alternative, the solvent used within the scope of the present invention only consists of water such as previously defined.

In a second alternative, the solvent used within the scope of the present invention consists of a mixture of water and at least one other protic solvent such as previously defined. A more particularly used mixture is a mixture of water and at least one hydroxylated solvent such as methanol and ethanol. Advantageously, when the solvent used is a mixture of water and at least one other protic solvent, the amount of water in the mixture is at least 50% expressed in volume based on the total volume of the mixture.

The aqueous solution in which the carbon nanotubes are dispersed in accordance with the method of the present invention and therefore the aqueous solution implemented during the step (a) of the method according to the invention contains at least one dispersing agent.

By "dispersing agent", it is intended a molecule enabling nanotubes to be preserved individually by steric hindrance around the nanotubes. Advantageously, such a dispersing agent is selected from the group consisting of dispersing polymers and surfactants.

Advantageously, a dispersing polymer is selected from the group consisting of water soluble homopolymers, water soluble random copolymers, water soluble block copolymers, water soluble graft polymers, in particular, polyvinyl alcohols, polyvinyl alcohol and polyvinyl acetate copolymers, polyvinylpyrrolidone, cellulose derivatives such as, for example, carboxymethylcellulose, carboxypropylcellulose, carboxymethylpropylcellulose, hydroxyethylcellulose, starch, gelatin, gelatin derivatives, amino acid polymers, polylysines, poly(aspartic acids), polyacrylates, polyethylene sulfonates, polystyrene sulfonates, polymethacrylates, polysulfonic acids, condensation products of aromatic sulfonic acids with formaldehyde, naphtalene sulfonates, lignin sulfonates, copolymers of acrylic monomers, polyethyleneimines, polyvinylamines, polyallylamines, poly(2-vinylpyridines), block copolyethers, block copolyethers with block polystyrenes, and polydiallyldimethylammonium chloride.

By "surfactant", it is intended a molecule including a lipophilic (apolar) part and a hydrophilic (polar) part. Advantageously, said at least one surfactant present in the aqueous solution during step (a) of the method of the invention is selected from anionic surfactants, cationic surfactants, zwitterionic surfactants, amphoteric surfactants and non-ionic surfactants. The aqueous solution implemented during a step (a) of the method can comprise several surfactants belonging to the same previously mentioned family of surfactants (i.e. anionic, cationic, zwitterionic, amphoteric or non-ionic) or several surfactants belonging to at least two distinct ones of these families of surfactants.

As a reminder, the anionic surfactants are surfactants the hydrophilic part of which is negatively charged such as alkyl or aryl sulfonates, sulfates, phosphates, or sulfosuccinates associated with a counter-ion such as an ammonium ($NH_4^+$) ion, a quaternary ammonium such as tetrabutylammonium, and alkaline cations such as $Na^+$, $Li^+$ and $K^+$.

Regarding anionic surfactants, it is for example possible to use tetraethylammonium paratoluenesulfonate, sodium dodecylsulfate, sodium palmitate, sodium stearate, sodium cholate, sodium deoxycholate, a mixture of sodium cholate and sodium deoxycholate (also known as "bile salt"), sodium myristate, sodium di(2-ethylhexyl) sulfosuccinate, methylbenzene sulfonate and ethylbenzene sulfonate.

The cationic surfactants are surfactants the hydrophilic part of which is positively charged, in particular selected from the quaternary ammoniums comprising at least one $C_4$-$C_{22}$ aliphatic chain associated with an anionic counter-ion selected in particular from the boron derivatives such as tetrafluoroborate or halide ions such as $F^-$, $Br^-$, $I^-$ or $Cl^-$. For cationic surfactants, it is for example possible to use tetrabutyl-ammonium chloride, tetradecyl-ammonium chloride, tetradecyl-trimethyl-ammonium bromide (TTAB), cetyl-trimethyl-ammonium bromide (CTAB), octadecyl-trimethyl-ammonium bromide, hexadecyl-trimethyl-ammonium bromide, alkylpyridinium halides bearing an aliphatic chain and alkylammonium halides.

The zwitterionic surfactants are neutral compounds having formal electrical charges of one unit and with opposite signs, in particular selected from the compounds having a $C_5$-$C_{20}$ alkyl chain generally substituted with a negatively charged function such as a sulfate or carboxylate and a positively charged function such as an ammonium. Regarding zwitterionic surfactants, sodium N,N-dimethyl-dodecyl-ammoniumbutanate, sodium dimethyl-dodecyl-ammonium propanate and amino acids can be mentioned.

The amphoteric surfactants are compounds behaving both as an acid or as a base depending on the medium in which they are placed. Regarding amphoteric surfactants, it is possible to use disodium lauroamphodiacetate and betaines such as alkylamidopropylbetaine or laurylhydroxysulfobetaine.

The non-ionic surfactants, also known as neutral surfactants, are surfactants which have no group able to be ionized in water at a neutral or near neutral pH. Such surfactants are however amphipathic since they contain lipophilic entities and hydrophilic entities. The surface active properties of the non-ionic surfactants, in particular hydrophilicity, are provided by uncharged functional groups such as alcohol, ether, ester, ketone or even amide, containing heteroatoms such as a nitrogen atom or oxygen atom. Because of the low hydrophilic contribution of these functions, the non-ionic surfactant compounds are most often polyfunctional. Any non-ionic surfactant known to those skilled in the art is usable within the scope of the present invention.

Advantageously, a non-ionic surfactant usable within the scope of the present invention is selected from alkyl alkoxylates; fatty alcohol alkoxylates; fatty amine alkoxylates; fatty acid alkoxylates; oxoalcohol alkoxylates; alkylphenol alkoxylates; alkyl ethoxylates; fatty alcohol ethoxylates; fatty amine ethoxylates; fatty acid ethoxylates; oxoalcohol ethoxylates; alkylphenol ethoxylates as, for example, octylphenol and nonylphenol ethoxylates; alcohols, α-diols, polyethoxylated and poly-propoxylated alkylphenols having a fatty chain comprising, for example, from 8 to 18 carbon atoms, the number of ethylene oxide or propylene oxide groups can be in particular from 2 to 50; complex polymers of polyethylene and polypropylene oxides; copolymers of ethylene and propylene oxides; block copolymers of polyethylene and polypropylene oxides as, for example, triblock copolymers POE-POP-POE; condensates of ethylene and propylene oxides on fatty alcohols; polyethoxylated fatty amides having, preferably, from 2 to 30 moles of ethylene oxide; polyethoxylated ethers having, preferably, from 2 to 30 moles of ethylene oxide as, for example, polyoxyethylene (20) stearyl ether (Brij®S20), polyethylene glycol tert-octylphenyl ether (Triton X-100®), polyethyleneglycol laurylether (POE23 or Brij®35) and decaethylene glycol monododecyl ether (C12E10®); monoesters (monolaurate, monomyristate, monostearate, monopalmitate, monooleate, etc.) and polyesters of fatty acids and glycerol; polyglycerol fatty amides comprising on average from 1 to 5 and, more especially, from 1.5 to 4 glycerol groups; oxyethylenated sorbitan fatty acid esters comprising from 2 to 30 moles of ethylene oxide; monoesters (monolaurate, monomyristate, monostearate, monopalmitate, monooleate, etc.) and polyesters of fatty acids and sorbitan, monoesters of polyoxyethylene sorbitan; fatty acid esters of sucrose; fatty acid esters of polyethyleneglycol; alkylpolyglycosides; N-alkyl glucamine derivatives and amine oxides such as (C10-C14) alkyl amine oxides or N-acylaminopropylmorpholine oxides; polyols (surfactants derived from sugars) in particular glucose alkylates such as for example glucose hexanate; surfactants derived from glucoside (sorbitol laurate) or polyols such as glycerol alcohol ethers; alcanolamides and mixtures thereof.

Within the scope of the present invention, the surfactant (s) implemented is (are) advantageously selected from non-ionic surfactants and anionic surfactants as previously defined.

The dispersing agent concentration, in particular of dispersing polymers or surfactants and, in particular, of non-ionic surfactants and/or anionic surfactants in the aqueous solution is advantageously between 1 g/l and 100 g/l of aqueous solution (i.e. between 0.1% and 10% by mass) and in particular between 2 g/l and 50 g/l of aqueous solution (i.e. between 0.2% and 5% by mass).

The present invention is applicable to any type of carbon nanotubes and whatever their preparation method. Thus, the carbon nanotubes implemented within the scope of the present invention can be nanotubes with a single graphene layer (SWNT), nanotubes with several graphene layers (MWNT) or a mixture of SWNT nanotubes and MWNT nanotubes.

Those skilled in the art know different techniques enabling such carbon nanotubes to be prepared. By way of examples, the physical methods based on carbon sublimation such as electrical arc methods, laser ablation or using a solar furnace and chemical methods consisting in pyrolyzing carbonaceous sources on metal catalysts and related to the chemical vapor deposition (CVD) method such as in particular the aerosol assisted catalytic chemical vapor deposition (CCVD) described by Castro et al [9]. Likewise, Hilding et al describe different techniques usable for preparing carbon nanotubes [1].

Advantageously, the nanotubes implemented within the scope of the present invention are carbon nanotubes with several graphene layers and, preferably, carbon nanotubes with several graphene layers having a mean length between 10 nm and 10 000 μm, notably between 20 nm and 8 000 μm, in particular between 50 nm and 6 000 μm and, most particularly, between 100 nm and 5 000 μm.

In a particular implementation, the nanotubes implemented within the scope of the present invention are carbon nanotubes with several graphene layers, having mean external diameters between 5 and 100 nm and mean lengths between 10 and 10000 μm, notably between 40 and 9 000 μm, in particular between 60 and 8 000 μm and, more particularly, between 100 and 1 000 μm. In this particular implementation, the carbon nanotubes are advantageously aligned.

The carbon nanotubes can be used as raw nanotubes, i.e. containing metal, impurities typically iron, within a range from 2 to 10% by mass based on the total mass of the nanotubes, but also purified by heat treatment, in particular under high temperature neutral atmosphere, typically 2 000° C., i.e. having a better graphitization and no metal impurity. They can also be purified by chemical treatment (acid, chlorine, . . . ), thus enabling iron to be removed, but generating surface defects.

The carbon nanotubes are present, in the aqueous solution, in an amount advantageously between 0.1 g/l and 200 g/l of aqueous solution (i.e. between 0.01% and 20% by mass), notably between 0.5 g/l and 100 g/l of aqueous solution (i.e. between 0.05% and 10% by mass) and, in particular, between 5 g/l and 50 g/l of aqueous solution (i.e. between 0.5% and 5% by mass).

The step (a) of the method according to the present invention consists in preparing an aqueous solution containing at least one dispersing agent and carbon nanotubes without mechanical stirring. Indeed, no technique enabling carbon nanotubes to be dispersed and in particular any mechanical technique as ultrasound treatment or mechanical stirring is used during step (a) of the method according to the present invention. In this way, the carbon nanotubes undergo no treatment which could result in decreasing the size or altering properties thereof.

In a particular embodiment, the carbon nanotubes such as previously defined are used vertically aligned as carpets. In this embodiment, step (a) consists in dipping, without stirring, carpet pieces of carbon nanotubes in an aqueous solution containing at least one dispersing agent as previously defined.

Step (b) of the method according to the present invention consists in freezing the aqueous solution containing at least one dispersing agent and the carbon nanotubes by dipping into liquid nitrogen (T°=−196° C.) and then totally thawing the ice cap, this freezing/thawing cycle can be repeated several times.

During this freezing phase, i.e. phase of dipping the suspension in liquid nitrogen, during which the aqueous solution located between the carbon nanotubes and in particular in the intertube space, typically between 80 and 100 nm, of the carpet of carbon nanotubes solidifies and, in view of the unique volume expansion properties of water at a low temperature (volume expansion in the order of 10%), expands, causing an increase in the space between the carbon nanotubes and in particular in the intertube space and a decrease in the Van der Waals interactions ensuring cohesion between the carbon nanotubes and in particular between the aligned carbon nanotubes.

During the thawing/defrost phase, the gap between the nanotubes initiated by the water expansion upon freezing is probably preserved as a result of the presence of the dispersing agent in the medium. On the other hand, the carbon nanotubes/liquid assembly, by switching from −196° C. to a positive temperature undergoes a heat shock. It may be reasonably thought that, following this heat shock, fractures are created in ice channels thus causing the fragmentation of the carbon nanotube agglomerates. Both these factors, alone or in combination, facilitate the dispersion of carbon nanotubes in the liquid medium.

During the freezing phase, the aqueous solution containing at least one dispersing agent and carbon nanotubes is placed in any flask type consisting of a material resisting at −196° C. (for example, polypropylene, polyethylene, polytetrafluoroethylene, . . . ). Thus, such a flask can be fully submerged in liquid nitrogen until the solution volume is completely solidified, that is, for example, 2 min for 50 ml of an aqueous solution containing at least one dispersing agent and carbon nanotubes. The liquid nitrogen level should be maintained to overcome its evaporation.

As regards the thawing phase, once the ice block is formed in the flask, the latter is quickly submerged in ambient temperature water (i.e. 20° C.±3° C.) for 30 s (heat quenching). The total return to liquid state can be made either by holding the solution at ambient temperature for the time required for liquefaction (about 5 h for 50 ml of solution); or by bringing all of them in an oven heated between 50° C. and 100° C. for speeding up the process (about 1 h for 50 ml of solution of 100° C.).

During step (b) of the method, the freezing/thawing cycle can be repeated several times, however, without making the total duration of the method prohibitive. The number of cycles necessary for receiving an efficient pre-dispersion slightly varies as a function of the length of the starting carbon nanotubes and is in the order of 5 to 100 cycles, notably in the order of 8 to 70 cycles and, in particular, from 10 to 40 cycles.

Indeed, step (b) of the method according to the present invention can be defined as a pre-dispersion step. However, for this pre-dispersion step to be as efficient as possible, the freezing/thawing phases should be implemented on a carbon nanotubes which are properly infiltrated or impregnated, i.e. properly wet by the aqueous solution containing at least one dispersing agent. In other words, the penetration of the aqueous solution containing at least one dispersing agent between the carbon nanotubes should be as optimum as possible. For this, it can be necessary to remove gas (air) bubbles trapped between the carbon nanotubes, in particular within the carpet of CNT and more precisely, the gas trapped in the intertube space. To this end, several strategies can be contemplated.

In a first embodiment, the aqueous solution containing at least one dispersing agent and the carbon nanotubes obtained following step (a) of the method can be subjected to a degassing prior to step (b) of the method. This degassing enables air trapped between the carbon nanotubes and in particular in the intertube space of the carpet of carbon nanotubes to be flushed and enables the aqueous solution and the surfactant to penetrate between the nanotubes and in particular into the intertube space. For this, any pumping type can be used as, for example, by placing the solution obtained following step (a) of the method under a vacuum bell with a primary pumping. The necessary pumping duration corresponds to the time to eliminate all of the air bubbles escaping from the carbon nanotubes and in particular from the carpets of carbon nanotubes in the solution, that is, for example between 30 and 60 min for a volume of 50 ml.

In a second embodiment, prior to step (a) of the method according to the invention, the carbon nanotubes and in particular the carpets of carbon nanotubes are preconditioned in the presence of water vapor or by impregnation with a protic solvent as previously defined and in particular with an hydroxylated solvent. Indeed, the pre-conditioning of the carbon nanotubes and in particular of the carpets of carbon nanotubes naturally hydrophobic in the presence of water vapor enables the penetration of an aqueous solution between the nanotubes to be improved. This optional step can be made by implementing a pumping device enabling the atmosphere to be saturated with water vapor. It is also possible to pre-condition the carpets by impregnating them with a hydroxylated solvent, i.e. an alcoholic solvent before putting them into the aqueous solution containing at least one dispersing agent.

It is clear that no mechanical technique as an ultrasound treatment or a mechanical stirring is used during step (b) of the method according to the present invention.

Step (b) of the method according to the present invention enables the size of the main agglomerates of carbon nanotubes to be dramatically reduced while initiating the individualization thereof in view of facilitating step (c) of the method which consists in subjecting the carbon nanotubes to an ultrasound treatment. Thus, step (c) of the method according to the present invention is the only step of said method implementing a mechanical technique enabling carbon nanotubes to be dispersed.

In particular, the carbon nanotubes present in the aqueous solution containing at least one dispersing agent are subjected to an ultrasound treatment with an ultrasonic bath or an ultrasonic probe for a duration between 5 min and 24 h and in particular between 10 min and 12 h. By way of examples, an ultrasonic bath or an ultrasonic probe releasing a power between 200 W and 750 W and operating at a frequency between 10 and 45 kHz can be used. For example, during step (c) of the method according to the invention, a Bioblock Vibracell™ type ultrasonic probe releasing a power of 375 W and working at a frequency of 20 kHz can be used.

Advantageously, when an ultrasonic probe is used during step (c) of the method according to the invention, the latter can be submerged down to the middle of the suspension, i.e. the aqueous solution containing at least one dispersing agent and carbon nanotubes and this solution can be placed in a water bath cooled to 0° C. to maintain a temperature close to the ambient temperature inside the suspension during the application of ultrasounds.

Step (c) of the method according to the present invention enables the dispersion of the carbon nanotubes to be completed using ultrasounds up to a full individualization of the nanotubes in the aqueous solution. By "full individualization", it is intended, within the scope of the invention, to achieve, in the suspension, a constant concentration of individual carbon nanotubes. This corresponds to the appearance of a plateau on the curve reporting the absorbance of the suspension as a function of the duration of the ultrasound treatment. The aggregates are considered as totally individualized for a duration of the ultrasound treatment included in the plateau of the absorbance curve and corresponding to the absence of agglomerates detectable under optical microscopy.

The present invention also relates to a suspension of carbon nanotubes in particular likely to be obtained by the preparing method according to the present invention. A suspension of carbon nanotubes according to the present invention is a suspension of carbon nanotubes such as previously defined in particular as regards their nature (SWNT, MWNT or a mixture thereof), their size, the aqueous solution and the surfactant present in the latter.

In a particular embodiment, the suspension according to the present invention comprises MWNT type carbon nanotubes present in an amount between 5 g/l and 50 g/l of suspension and the dispersing agent present in this suspension is a non-ionic surfactant.

In such a suspension, the MWNT type carbon nanotubes are long, i.e. MWNT type carbon nanotubes having a mean length higher than 1 µm and in particular higher than 5 µm.

Other characteristics and advantages of the present invention will further appear to those skilled in the art upon reading examples given below by way of illustrating and non-limiting purposes, in reference to the appended figures.

BRIEF DESCRIPTION OF THE DRAWINGS

FIG. 1 presents different CNT images with a macroscopic image of a carpet of CNT (FIG. 1A), a scanning electron microscopy (SEM) image with a low magnification of a carpet of CNT (FIG. 1B) and an SEM image with a high magnification of the alignment of the CNT in the carpet (FIG. 1C).

FIG. 2 shows an SEM image of ground carpets (FIG. 2A) and an optical image of carpets after 16 dipping cycles in liquid nitrogen (FIG. 2B).

FIG. 3 shows the time change in the absorbance as a function of the duration of ultrasounds for the dispersing method according to the invention "CRYO" and for two dispersing methods of prior art "BR" and "US".

DETAILED DISCLOSURE OF PARTICULAR EMBODIMENTS

Prior Remarks

Figures 4A, 4B, 4C:
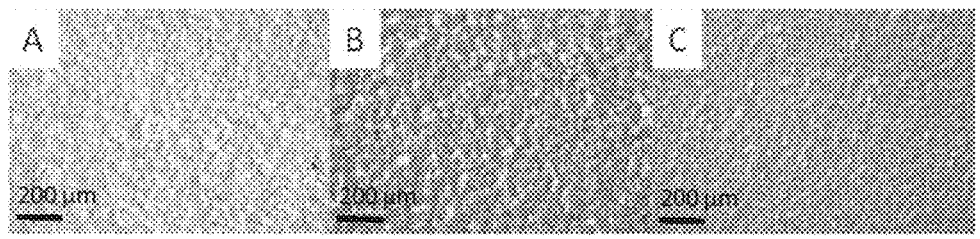
FIG. 4 shows the optical microscopy image of the suspensions of CNT in water+surfactant for the technique "US" after 2 h of ultrasounds (FIG. 4A), for the technique "BR" after 1 h15 of ultrasounds (FIG. 4B) and for the technique "CRYO" after 1 h of ultrasounds (FIG. 4C).

In all the examples hereinafter, the CNT used are synthetized by aerosol CVD according to the method described by Castro et al [9] and are in the form of aligned carpets, as shown in FIGS. 1B and 1C. For the sake of comparison, commercial Intermingled CNT have also been used for example 4.

The suspension is characterized at each step of the method. For the pre-dispersion step, the determination of the optimum number of cycles corresponds to a maximum reduction in the size of the agglomerates. This number is evaluated by monitoring the macroscopic change in the size of the agglomerates by optical microscopy (Olympus BX60) every two cycles from a suspension drop. A UV-visible characterization (Jam) V-570) can be made to monitor the change of the individualization of the CNT as a function of the number of cycles.

As regards the ultrasound dispersing step, the necessary duration of ultrasounds to have a fully dispersed suspension is determined by optical microscopy (Olympus BX60) and UV-visible (Jam) V-570). The solution is said to be fully dispersed when the UV-visible absorbance (measured at $\lambda=750$ nm) of the suspension has reached a maximum and the observations by optical microscopy do not show the presence of agglomerates any longer.

The measurement of the length of the CNT can be made by three complementary techniques which are:
- the optical microscopy (Olympus BX60);
- the scanning electron microscopy (MEB-FEG Karl Zeiss Ultra55) and
- the transmission electron microscopy (MET Philips CM12).

In optical microscopy, a suspension drop, diluted by a factor ranging from 200 to 400 times, is dried on a glass slide in an oven at 100° C. before observation. For SEM, the deposition of a suspension drop can be made by spin-coating on a silicon substrate or by drying a drop, diluted by a factor ranging from 200 to 400 times, on a silicon substrate. Finally for TEM, a suspension drop diluted by the same factor as in SEM will be deposited on a copper grid covered with a carbon liner.

The stability overtime of the suspension is analyzed by UV-visible. Daily samplings are made during 30 days and the change in the absorbance ($\lambda=750$ nm) is monitored over this period.

EXAMPLE 1

Comparison Between the Present Invention and Two Other Dispersing Methods

Three suspensions have been made: the first one from the method of the present invention and the other two by techniques commonly used in literature as, for example, ultrasounds alone (Yu et al [10]) or with a dry grinding followed by a step using ultrasounds (Krause et al [3]):
- Dispersion by a single step using an ultrasound probe, hereinafter referred to as "US";
- Dispersion by dry grinding in a mortar and then by an ultrasonic probe, hereinafter referred to as "BR"; and Dispersion by the way described by the present invention, hereinafter designated "CRYO".

The suspensions contain 0.5% by mass of aligned CNT the initial mean length of which is 500 µm and the mean external diameter of which is 25 nm, 1% by mass of bile salt in 50 ml ultra-pure water (18.2 MΩ). The raw pieces of carpets have a size ranging from a few mm to nearly 1 cm (FIG. 1A).

After the pre-dispersion phase, the width of the pieces is in the order of 200 µm by grinding (FIG. 2A) as well as after 16 dipping cycles in liquid nitrogen (FIG. 2B). However, in spite of an identical size, a difference can be observed in the morphology of the pieces at the end of the dispersion "CRYO". Indeed, as shown by the arrows in FIG. 2B, there is not only a reduction in the size but also a "bursting" of the carpets which can come from the fractures perpendicular to the alignment of the carpets and thus repelling the tubes from each other.

The ultrasounds are then applied for 2 h using a Bioblock Vibracell™ probe at a power of 375 W with regular samplings every 15 min for characterizing the dispersion state.

FIG. 3 represents the change in the absorbance as a function of the duration of the ultrasounds. For all the three dispersion methods, this change is exponential. However, for the present invention (curve "CRYO"), the asymptote, which characterizes a full dispersion state, is reached more quickly, that is after 1 h of ultrasounds versus 1 h15 and 2 h respectively for the methods "BR" and "US".

Likewise, the maximum absorbance values are comparable for each method, that is 0.982 for "CRYO", 0.948 for "BR" and 0.921 for "US", which shows a nearly identical dispersion state but obtained with variable durations of ultrasounds.

The observations by optical microscopy (FIG. 4) show a full dispersion state (absence of big agglomerates the size of which is at least about ten microns) for an ultrasound duration of 2 h for "US" (FIG. 4A), 1 h15 for "BR" (FIG. 4B) and 1 h for "CRYO" (FIG. 4C).

The lengths of the tubes are measured by optical microscopy and SEM, which gives:
method "US": 4.6±2.2 µm;
method "BR": 5.2±2.7 µm;
method "CRYO": 6.3±3.5 µm.

The present invention "CRYO" enabled the mean length of the tubes to be increased by 20% with respect to "BR" and by nearly 40% with respect to "US".

Concerning the stability observed through spectrometry, the suspension prepared with the present invention does not have settling during the first 5 hours following its dispersion.

EXAMPLE 2

Influence of the Surfactant

The present invention has been implemented with different surfactants. The latter are: sodium dodecylsulfate (SDS), bile salt, sodium cholate, sodium deoxycholate and Brij® S20.

All the suspensions contain 0.5% by mass (5 mg/ml) of CNT, with an initial length of 500 µm with a mean external diameter of 25 nm and 1% by weight of surfactant in ultra-pure water (18.2 MΩ). Each suspension has undergone 16 freezing/thawing cycles in liquid nitrogen. The ultrasounds are applied for 2 h according to the same protocol as in example 1 and the characterizations are also made according to the same protocol.

Figure 5:
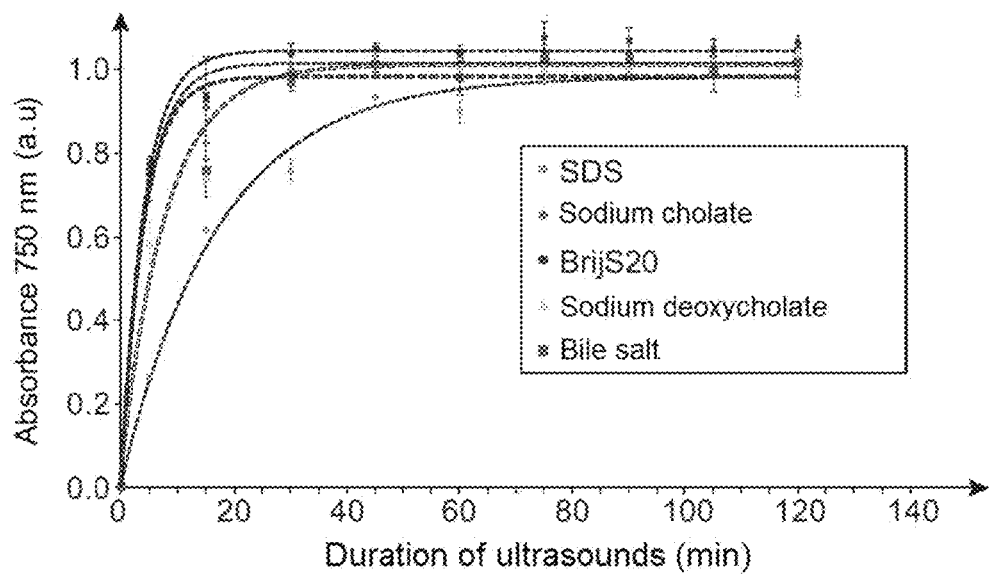
FIG. 5 shows the change in the absorbance as a function of the duration of ultrasounds for different surfactants used within the scope of the dispersing method according to the invention.

FIG. 5 shows that the change in the absorbance is not the same depending on the surfactant used. Indeed, with SDS, the duration to reach the asymptote is longer. The maximum absorbance values are comparable, that is respectively 0.9820; 0.9822; 1.0144; 1.0107 and 1.0455 for SDS, bile salt, sodium cholate, sodium deoxycholate and Brij®S20. Thus, different durations of ultrasounds are necessary to achieve the same dispersion state.

Figure 6:
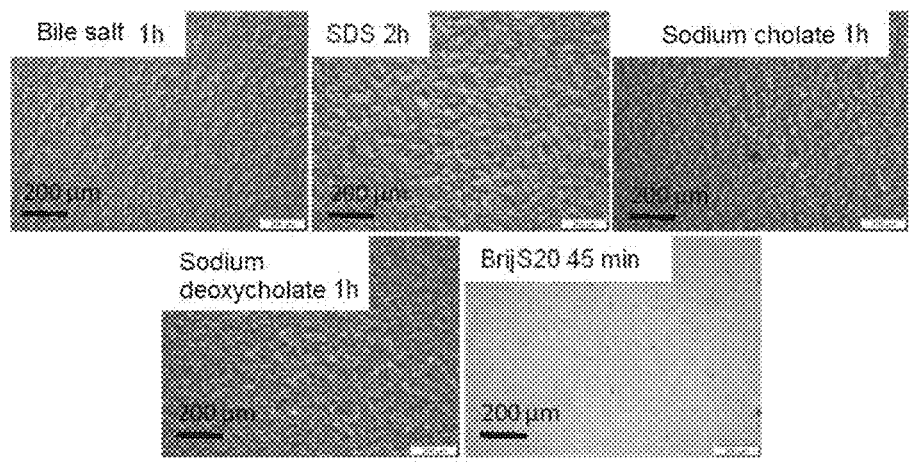
FIG. 6 shows the optical microscopy image of the dispersion state of the suspensions of CNT in water with different surfactants.

FIG. 6 shows that to achieve this same dispersion state, the necessary duration of ultrasounds switches from 2 h with SDS to 45 min with Brij® S20. As regards the mean length of the nanotubes, Table 1 gathers all the mean lengths measured by SEM and optical microscopy for each surfactant used, as well as the centiles at 10%, 50% and 90% (respectively noted $L_{10}$, $L_{50}$, $L_{90}$).

TABLE 1

Mean length of the CNTs in the different suspensions.

|  | Duration US | Mean length | $L_{10}$ | $L_{50}$ | $L_{90}$ |
|---|---|---|---|---|---|
| Bile salt | 1 h | 6.3 ± 3.5 µm | 2.8 µm | 5.6 µm | 9.9 µm |
| SDS | 2 h | 5.1 ± 3.0 µm | 1.8 µm | 3.5 µm | 10.1 µm |
| Sodium cholate | 1 h | 6.1 ± 3.2 µm | 2.8 µm | 5.6 µm | 10.2 µm |
| Sodium deoxycholate | 1 h | 6.7 ± 3.5 µm | 2.6 µm | 6.2 µm | 10.9 µm |
| Brij ®S20 | 45 min | 6.7 ± 3.5 µm | 3.3 µm | 5.9 µm | 10.6 µm |

The mean lengths of the CNT within the suspensions are similar, and higher than 6 µm for all the surfactants tested except for SDS for which the mean length of the CNT is in the order of 5 µm. On the other hand, all the suspensions exhibit, after the ultrasounds, an equivalent length of the CNT (in the order of 10.3±0.6 µm) for the centile 90.

With regard to the state of the art on the stability of suspensions which, generally, only takes the visual aspect of the suspension into account (considered as stable if the suspension remains "black"), all the suspensions obtained by the method according to the present invention thus remain stable even after 11 months.

However, it should be noted that a visually "black" suspension can however have a settling but this will only be detectable by UV-visible spectroscopy by monitoring the change in the absorbance of the suspension. Indeed, the decrease in the absorbance is directly related to the formation of the settling bottom layer which causes a decrease in the concentration of the suspension and thus, thanks to the Beer-Lambert law, a decrease in the absorbance intensity.

Figure 7:
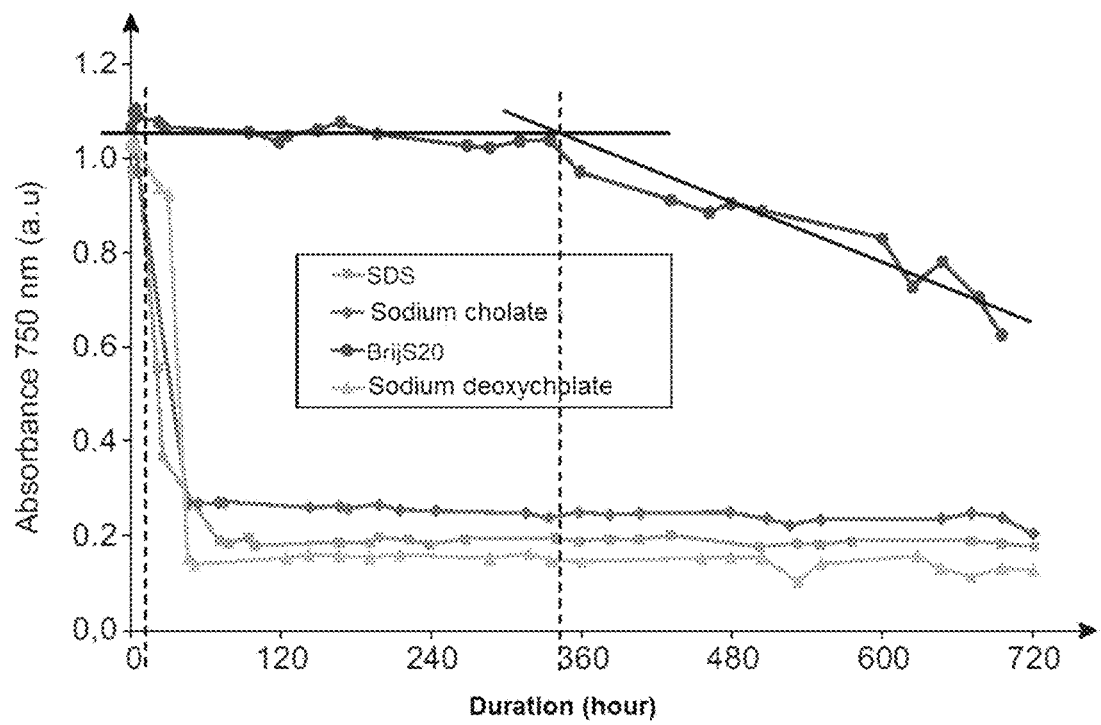
FIG. 7 shows the change in the absorbance as a function of time for suspensions of CNT in water with different surfactants.

That is why daily samplings of 10 µl of suspension at about 1 cm from the surface, that is in the supernatant, have been made and analyzed by UV-visible spectroscopy. The results are reported in FIG. 7. Thus, it can be noticed that the suspension with Brij®S20 has a very long stability in time in the order of 15 days before a gradual settling appears. With the other surfactants, the settling phenomenon quickly appears (within 24 h), the suspension supernatant (hence less concentrated than the initial suspension) then remaining stable over a very long period (>30 days).

EXAMPLE 3

Effect of the CNT Concentration

Two suspensions containing either 1% by mass, or 0.5% by mass of CNT have been dispersed according to the method of the present invention.

The CNT, with an initial length 500 µm for an average external diameter of 25 nm, are put in solution in 50 ml ultra-pure water (18.2 MΩ) with 1% by mass of Brij®S20 for 0.5% by mass of CNT or 1.2% by mass Brij®S20 for 1% by mass of CNT.

Both suspensions have undergone 16 cycles in liquid nitrogen before being subjected to ultrasounds according to the same protocol as in examples 1 and 2. The dispersion state is characterized by UV-visible and optical microscopy according to the same protocol as in examples 1 and 2.

Figure 8:
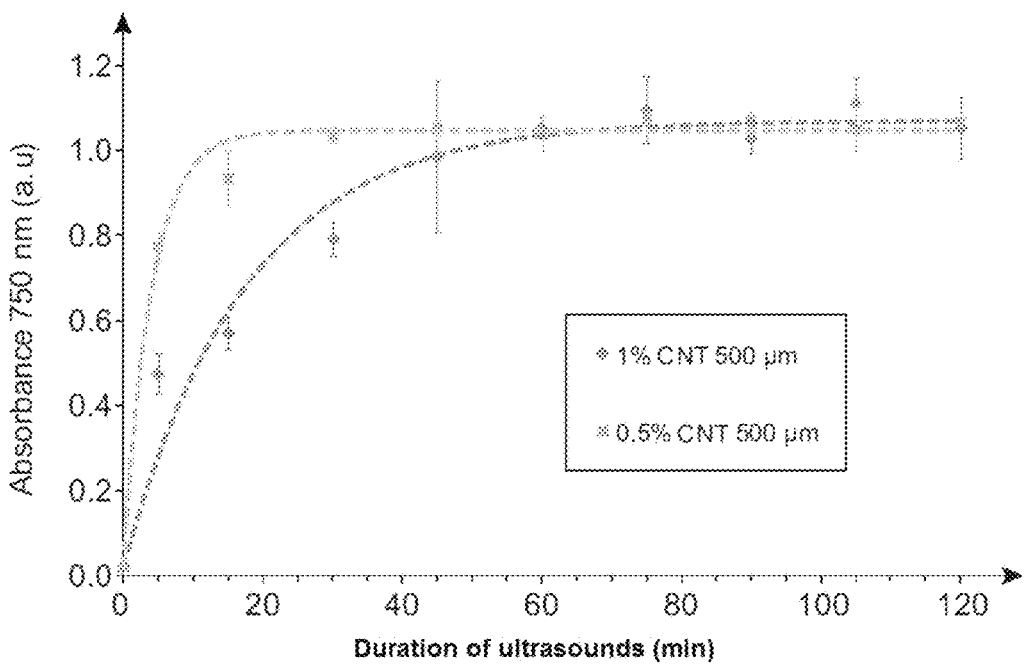
FIG. 8 shows the change in the absorbance as a function of the duration of ultrasounds for suspensions comprising different amounts of CNT.
Figures 9A, 9B:
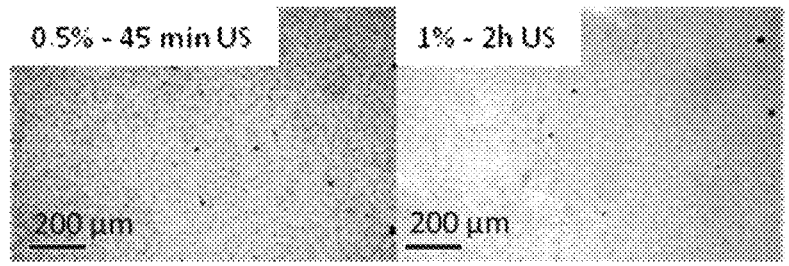
FIG. 9 shows the optical microscopy image of two suspensions comprising 0.5% by mass of CNT after 45 min of ultrasounds (FIG. 9A) and 1% by mass of CNT after two hours of ultrasounds (FIG. 9B).

FIG. 8 shows a less quick change in the absorbance for a suspension with 1% by mass of CNT. 20 min of ultrasounds only are necessary with 0.5% by mass of CNT to reach the plateau versus 60 min minimum with 1% by mass of CNT. However, the disappearance of the aggregates is reached after 45 min and two hours of US for the suspension with 0.5% by mass of CNT and 1% by mass of CNT respectively, as clearly shown by the optical microscopy photographs in FIG. 9.

Thus obtained mean lengths are:
6.7±3.5 µm with 0.5% by mass of CNT;
4.0±1.7 µm with 1% by mass of CNT.

This example shows that it is possible to obtain a concentrated CNT suspension (1% by mass) and properly dispersed, while keeping a mean length higher than 1 µm (about 4 µm).

EXAMPLE 4

Effect of the Initial Length of the Aligned CNT and of the Arrangement

In this example, three suspensions have been prepared with different initial lengths of aligned CNT: 250, 500 and 1 000 µm and a suspension with commercial intermingled CNT. The CNT concentration for all the suspensions is 1% by mass and the surfactant concentration (Brij®S20) is 1.2% by mass. Characterizations by optical microscopy and UV-visible are made every two cycles in liquid nitrogen.

Figure 10:
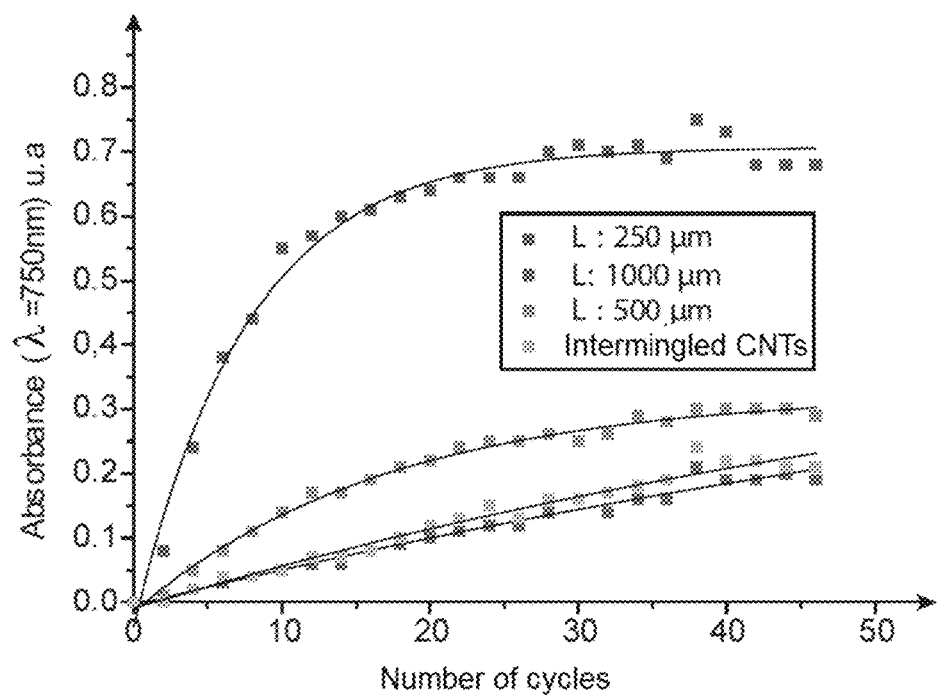
FIG. 10 shows the change in the absorbance as a function of the number of dipping cycles in liquid nitrogen for suspensions comprising aligned CNT with different lengths or intermingled CNT.
Figure 11:
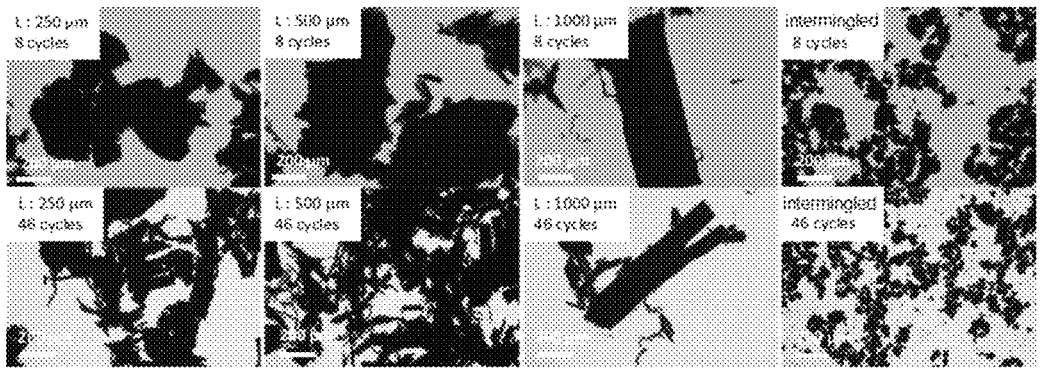
FIG. 11 shows optical images of the suspensions comprising aligned CNT with different lengths or intermingled CNT after 8 and 46 dipping cycles in liquid nitrogen.

The UV-visible analyses show a much higher absorbance with CNTs of 250 µm and a nearly identical behavior for tubes of 1 000 µm and intermingled tubes (FIG. 10). Moreover, it would seem that a plateau is reached with 40 cycles for all the suspensions. As regards the size of the initial carpet pieces, a reduction is observed between 8 and 46 cycles for the suspensions with CNT of 250 and 500 µm (FIG. 11). Besides, for CNT of 1 000 µm and intermingled CNT, the size reduction is far less pronounced.

This example highlights the interest, in order to take advantage of all the benefits of the pre-dispersion phase by dipping into liquid nitrogen, to use aligned CNT with respect to intermingled CNT and preferentially with mean lengths lower than 1 000 µm.

REFERENCES

[1] Hilding et al, 2003, "Dispersion of carbon nanotubes in liquids", *Journal of dispersion science and technology*, vol. 24, pages 1-41.
[2] Changyu et al, 2011, "Wet-grinding assisted ultrasonic dispersion of pristine multiwalled carbon nanotubes (MWCNTs) in chitosan solution", *Colloids and Surfaces B: Biointerfaces*, vol. 86, pages 189-197.
[3] Krause et al, 2011, "Influence of dry grinding in a ball mill on the length of multiwalled carbon nanotubes and their dispersion and percolation behaviour in melt mixed polycarbonate composites", *Composites Science and Technology*, vol. 71, pages 1145-1153.
[4] International application WO 2010/106287 on behalf of Arkema, published on 23 Sep. 2010.
[5] Patent application US 2010/0330358 on behalf of Meijo Nano Carbon Co., Ltd. published on 30 Dec. 2010.
[6] International application WO 2009/063008 on behalf of Stichting Dutch Polymer Institute and Massachusetts Institute of Technology, published on 22 May 2009.
[7] U.S. Pat. No. 8,324,487 on behalf of Tongde Shen and Jing Li, issued on 4 Dec. 2012.
[8] Xu et al, 2011, "A two-step shearing strategy to disperse long carbon nanotubes from vertically aligned multi-walled carbon nanotube arrays for transparent conductive films", *Langmuir*, vol. 26, pages 2798-2804.
[9] Castro et al, 2013, "The role of hydrogen in the aerosol-assisted chemical vapor deposition process in producing thin and densely packed vertically aligned carbon nanotubes", *Carbon*, vol. 61, pages 585-594.
[10] Yu et al, 2007, "Controlling the dispersion of multi-wall carbon nanotubes in aqueous surfactant solution", *Carbon*, vol. 45, pages 618-623.

What is claimed is:

1. A method for preparing a suspension of carbon nanotubes in an aqueous solution comprising the following successive steps:
   a) contacting, without mechanical stirring and without ultrasound treatment, carbon nanotubes with an aqueous solution containing at least one dispersing agent;
   b) subjecting, without mechanical stirring and without ultrasound treatment, the aqueous solution containing carbon nanotubes and a dispersing agent obtained following step (a) to at least one cycle of freezing in liquid nitrogen and thawing;
   c) subjecting the thawed solution obtained following step (b) to an ultrasound treatment.

2. The method according to claim 1, wherein said aqueous solution contains, as a solvent, water and, optionally, another protic solvent.

3. The method according to claim 1, wherein said dispersing agent is selected from the group consisting of dispersing polymers and surfactants.

4. The method according to claim 3, wherein the surfactants are selected from the group consisting of non ionic surfactants and anionic surfactants.

5. The method according to claim 1, wherein the dispersing agent concentration is between 1 g/l and 100 g/l of aqueous solution (equivalent to between 0.1% and 10% by mass).

6. The method according to claim 1, wherein said carbon nanotubes are carbon nanotubes with several graphene layers having a mean length between 10 nm and 10,000 µm.

7. The method according to claim 1, wherein said carbon nanotubes are carbon nanotubes with several graphene layers, having mean external diameters between 5 and 100 nm and mean lengths between 10 and 10,000 µm, said nanotubes being optionally aligned.

8. The method according to claim 1, wherein said carbon nanotubes are present, in the aqueous solution, in an amount between 0.1 g/l and 200 g/l of aqueous solution (equivalent to between 0.01% and 20% by mass).

9. The method according to claim 1, wherein step (b) has in the order of 5 to 100 freezing/thawing cycles.

10. The method according to claim 1, wherein said aqueous solution containing at least one dispersing agent and the carbon nanotubes obtained following step (a) is subjected to a degassing prior to said step (b).

11. The method according to claim 1, wherein, prior to said step (a), the carbon nanotubes are preconditioned in the presence of water vapour or by impregnation with a protic solvent.

12. The method according to claim 1, wherein, during said step (c), the carbon nanotubes present in the aqueous solution containing at least one dispersing agent are subjected to an ultrasound treatment with an ultrasonic bath or with an ultrasonic probe for a duration between 5 min and 24 h.

13. A suspension of carbon nanotubes obtained by a method according to claim 1, comprising MWNT type carbon nanotubes present in an amount between 5 g/l and 50 g/l of suspension, wherein the dispersing agent present in this suspension is a non ionic surfactant and wherein the solvent of the suspension only consists of water.

14. The suspension according to claim 13, wherein said MWNT type carbon nanotubes have a mean length higher than 1 µm.

15. The method according to claim 1, wherein the dispersing agent concentration is between 2 g/l and 50 g/l of aqueous solution (equivalent to between 0.2% and 5% by mass).

16. The method according to claim 1, wherein said carbon nanotubes are carbon nanotubes with several graphene layers having a mean length between 100 nm and 5,000 µm.

17. The method according to claim 1, wherein said carbon nanotubes are carbon nanotubes with several graphene layers, having mean external diameters between 5 and 100 nm and mean lengths between 100 and 1,000 µm, said nanotubes being aligned.

18. The method according to claim 1, wherein said carbon nanotubes are present, in the aqueous solution, in an amount between 5 g/l and 50 g/l of aqueous solution (equivalent to between 0.5% and 5% by mass).

19. The method according to claim 1, wherein step (b) has in the order of from 10 to 40 freezing/thawing cycles.

20. The suspension according to claim 13, wherein said MWNT type carbon nanotubes have a mean length higher than 5 µm.

* * * * *